H. K. STONER.
Seed Dropper.
No. 1,314, 32,318.
Patented May 14, 1861.
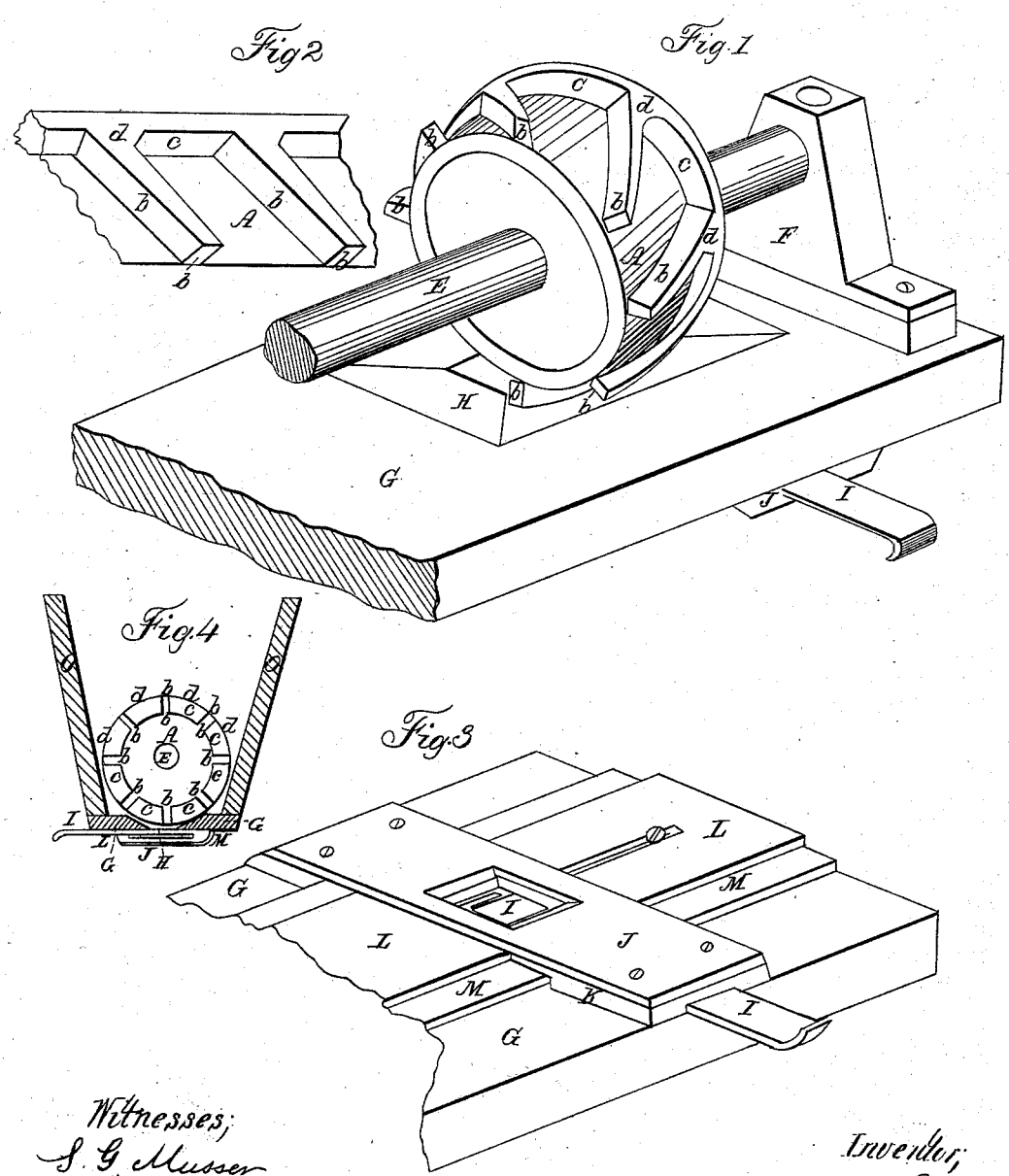

UNITED STATES PATENT OFFICE.

HENRY K. STONER, OF NEAR LANCASTER, PENNSYLVANIA.

IMPROVEMENT IN SEEDING-MACHINES.

Specification forming part of Letters Patent No. 32,318, dated May 14, 1861.

*To all whom it may concern:*

Be it known that I, HENRY K. STONER, at or near Lancaster, in the county of Lancaster and State of Pennsylvania, have invented a new and Improved Feed-Roller for Seeding-Machines; and I do hereby declare that the following is a full, clear, and exact description of the construction and operation of the same, reference being had to the accompanying drawings, making part of this specification—

Figure 1 being a perspective view of one of the seed-rollers, its shaft, and bearing, and also a portion of the bottom of the seed box or hopper, the sides of said seed-box being removed; Fig. 2, a diagram representing the periphery of the seed-roller as a plane surface; Fig. 3, a perspective view of a portion of the bottom of the seed box or hopper turned over, and representing more particularly the arrangement of the regulating-slides and discharge-apertures; Fig. 4, a transverse vertical section of the seed-box and roller-shaft, and representing an end view of one of the seed-rollers.

Like letters designate corresponding parts in all the figures.

A seed box or hopper, composed of a bottom, G, and sides O O, Fig. 4, is mounted in any ordinary or convenient manner on driving-wheels, and longitudinally in this seed-box is situated a roller-shaft, E, resting in bearings F F and actuated from the driving-wheels by any suitable arrangement of banding or gearing. At proper distances apart on this shaft are secured seed-rollers A A, of suitable size, and fitting closely in the bottom of the seed-box. In the periphery of each of these rollers are a suitable number of seed cells or pockets, $c\ c\ c$, sunk below the surface, and formed as follows: One edge of the periphery of the seed-roller is unbroken, (when the seed-cells are made therein,) thereby forming a flange or rim, $d$, the entire circumference of the roller, substantially as represented in Fig. 1. This flange or rim forms the base or rear end of the seed-cells. Connected with the flange $d$, and extending forward diagonally or obliquely across the periphery of the seed-roller in the direction of its motion, are a suitable number of partitions, $b\ b\ b$, which form the division and walls of the seed-cells. The outer ends of the seed-cells, or the ends opposite the flange $d$, are left open, as represented in Fig. 1. The object of this peculiar arrangement of the seed-rollers is to insure a more regular and uniform flow and accurate measurement of the seed in its passage from the machine.

In the use of the ordinary seed-roller, where the seed-cells are closed at both ends and where the cells are filled only by the weight of the seed falling into them, some of the cells will be entirely filled, while others will only be partially filled, and consequently the passage of the seed will be very unsteady; and this is especially true in the planting of seeds of a light or furry nature. By the use of my improved roller this objection is overcome. As the roller is revolved not only does the weight of the seed above the roller tend to fill the cells, but the diagonal or oblique partitions $b\ b\ b$, turning in the mass of seed in the seed-box and acting on the principle of a screw, constantly draw the seed into the cells through the open ends thereof. Thus the seed-cells are always closely packed or filled alike, and the flange or rim $d$ always prevents the escape of the seed at the opposite end of the roller, thereby giving an accurate measurement and causing the seed to properly fall beneath and escape.

The bottom G of the seed box or hopper, directly under the seed-rollers, is provided with discharge-apertures H H, usually made beveled on their upper sides, as represented in Figs. 1 and 4. The under side of the bottom G is provided with suitable guide-plates, J J, to support longitudinal regulating plates or slides L M, which have discharge-apertures K K, corresponding in position with the apertures H H above. By means of these regulating-plates all the apertures for the escape of the seed are regulated in size or entirely closed at one movement. In addition to these longitudinally-regulating plates or slides, I also employ independent transverse slides I I, one to each discharge-aperture, by means of which one or more apertures may be regulated or made adjustable in size or entirely closed, while the others are unchanged.

What I claim as my invention, and desire to secure by Letters Patent, is—

The seed-roller A, having seed-cells $c\ c\ c$, open at one end and formed by the diagonal partitions $b\ b\ b$ and flange $d$, substantially as and for the purpose herein set forth.

H. K. STONER.

Witnesses:
S. G. MUSSER,
JACOB STAUFFER.